United States Patent
Zhao (10) Patent No.: US 11,209,332 B2
(45) Date of Patent: Dec. 28, 2021

(54) PRESSURE CALIBRATION APPARATUS AND PRESSURE INSTRUMENT CALIBRATION INFORMATION PROCESSING METHOD

(71) Applicant: Beijing Const Instruments Technology Inc., Beijing (CN)

(72) Inventor: Shichun Zhao, Beijing (CN)

(73) Assignee: Beijing Const Instruments Technology Inc.

( * ) Notice: Subject to any disclaimer, the term of this patent is extended or adjusted under 35 U.S.C. 154(b) by 106 days.

(21) Appl. No.: 16/613,676

(22) PCT Filed: Sep. 13, 2018

(86) PCT No.: PCT/CN2018/105370
§ 371 (c)(1),
(2) Date: Nov. 14, 2019

(87) PCT Pub. No.: WO2019/011353
PCT Pub. Date: Jan. 17, 2019

(65) Prior Publication Data
US 2020/0408630 A1    Dec. 31, 2020

(30) Foreign Application Priority Data

Jul. 14, 2017  (CN) .......................... 201710574039.8
Jul. 14, 2017  (CN) .......................... 201720860072.2

(51) Int. Cl.
*G01L 27/00*    (2006.01)
*G01L 19/00*    (2006.01)
(Continued)

(52) U.S. Cl.
CPC ........ *G01L 27/005* (2013.01); *G01L 19/0092* (2013.01); *G01L 19/086* (2013.01);
(Continued)

(58) Field of Classification Search
CPC .  G01L 27/005; G01L 19/0092; G01L 19/086; G01L 27/002; G06K 9/00771;
(Continued)

(56) References Cited

U.S. PATENT DOCUMENTS

2014/0182354 A1   7/2014  Jiang
2014/0260518 A1   9/2014  Swar et al.
(Continued)

FOREIGN PATENT DOCUMENTS

CN   101510088 A   8/2009
CN   102435392 A   5/2012
(Continued)

OTHER PUBLICATIONS

International Search Report for PCT/CN2018/105370 dated Dec. 3, 2018.

*Primary Examiner* — Nasim N Nirjhar
(74) *Attorney, Agent, or Firm* — Lerner, David, Littenberg, Krumholz & Mentlik, LLP (57) ABSTRACT

A pressure calibration apparatus and a pressure instrument calibration information processing method, belonging to the field of pressure instrument measurement and calibration. The pressure calibration apparatus comprises: a pressure calibration unit (1) externally connected to the calibrated pressure instrument (100); a main control unit (2), which is electrically connected to the pressure calibration unit (1); a communication module (3) that is electrically connected to the main control unit (2), and carries out data interaction with a remote database (300) through a network (200). The pressure calibration apparatus can be in a real-time communication connection with the remote database (300), and implements on-field real-time downloading of historical
(Continued)

calibration data and calibration schemes of the calibrated pressure instrument (100) and real-time uploading of current calibration data.

8 Claims, 3 Drawing Sheets

(51) Int. Cl.
    *G01L 19/08*     (2006.01)
    *G06K 9/00*     (2006.01)
    *H04N 5/225*     (2006.01)
    *H04N 7/18*     (2006.01)

(52) U.S. Cl.
    CPC ....... *G06K 9/00771* (2013.01); *H04N 5/2253* (2013.01); *H04N 7/18* (2013.01)

(58) Field of Classification Search
    CPC ........ H04N 5/2253; H04N 7/18; H04N 7/183; H04N 5/2257
    See application file for complete search history.

(56) References Cited

U.S. PATENT DOCUMENTS

| | | | | |
|---|---|---|---|---|
| 2016/0301044 A1* | 10/2016 | Huang | ............... | H01M 50/20 |
| 2017/0147807 A1* | 5/2017 | Rooyakkers | ........... | H04N 7/183 |
| 2019/0244049 A1* | 8/2019 | Petruk | ................. | G06K 9/6202 |
| 2020/0096371 A1* | 3/2020 | Ray | ..................... | G01D 18/008 |

FOREIGN PATENT DOCUMENTS

| | | | |
|---|---|---|---|
| CN | 102680170 | A | 9/2012 |
| CN | 102706511 | A | 10/2012 |
| CN | 102840948 | A | 12/2012 |
| CN | 102252805 | B | 1/2013 |
| CN | 102980715 | A | 3/2013 |
| CN | 103487210 | A | 1/2014 |
| CN | 105547587 | A | 5/2016 |
| CN | 207074102 | U | 3/2018 |

* cited by examiner

PRESSURE CALIBRATION APPARATUS AND PRESSURE INSTRUMENT CALIBRATION INFORMATION PROCESSING METHOD

CROSS REFERENCE TO RELATED APPLICATIONS

The present application is a national phase entry under 35 U.S.C. § 371 of International Application No. PCT/CN2018/105370, filed Sep. 13, 2018, which claims priority from Chinese Patent Application Nos. 201710574039.8 and 201720860072.2 filed Jul. 14, 2017, all of which are hereby incorporated herein by reference.

FIELD OF THE INVENTION

The present invention belongs to the field of pressure instrument measurement and calibration, and relates to a pressure calibration apparatus that can communicate with (access) a database remotely in real time and a pressure instrument calibration information processing method.

BACKGROUND ART

Pressure instruments used in fields such as industrial production and pressure measurements, etc. have to be calibrated periodically, to ensure the pressure instruments detect pressure accurately and ensure the pressure equipment is used within safety limits. Pressure instruments existing on industrial sites must be calibrated with on field pressure calibration apparatuses. Different calibration schemes are required for different types of pressure instruments.

An advanced calibration method for existing pressure instruments is usually as follows: the calibration apparatus is carried to a laboratory and connected to a computer in the laboratory, and required information, including calibration scheme, historical calibration data and other attributes of the calibrated pressure instrument, is downloaded from a local database via the computer; alternatively, the operator logs required information on paper with a pen in the laboratory and then carries the required information to the industrial site; after arriving at the industrial site where the calibrated pressure instrument exists, the operator calibrates the pressure instrument according to the logged information, stores acquired calibration data and other data into the calibration apparatus or logs the data on paper; then the operator returns to the laboratory and uploads the data to a database via a computer.

With the above-mentioned method, the operator has to travel between the laboratory and the industrial site, while can't upload the calibration data of the calibrated pressure instrument in real time on the industrial field. Moreover, the method of logging the data manually on paper with a pen involves a problem of data reliability.

Further, though a solution of connecting a pressure calibration apparatus to a database via a communication apparatus (e.g., a cell phone, etc.) has emerged now, such a solution requires configuring a network (e.g., Bluetooth) for connection respectively on the cell phone and the pressure calibration apparatus, which is often cumbersome and complex, and can't be accomplished by ordinary technicians on some industrial field.

Therefore, it is necessary to provide a pressure calibration apparatus and a pressure instrument calibration information processing method, wherein the pressure calibration apparatus can communicate with and connect to a remote database in real time, so that the historical calibration data and calibration scheme of a calibrated pressure instrument can be downloaded and the current calibration data can be uploaded in real time on an industrial field.

CONTENTS OF THE INVENTION

To solve the above problems, the present invention provides a pressure calibration apparatus that is simple to operate and convenient to use, and can communicate with a remote database in real time. The apparatus can calibrate a calibrated pressure instrument and carry out real-time information interaction with a remote database on an industrial site.

The above object of the present invention is achieved with the following solution:

A pressure calibration apparatus for calibrating a calibrated pressure instrument (100) on field, comprising a pressure calibration unit (1), and a main control unit (2) and a communication module (3) that are electrically connected with the pressure calibration unit (1), wherein the pressure calibration unit (1) is externally connected to the calibrated pressure instrument (100), and the communication module (3) accesses a remote database (300) through a network (200).

In the pressure calibration apparatus described above, the communication module (3) is a communication program integrated in the main control unit (2), the main control unit (2) is provided with a network interface, and the communication module (3) accesses the network (200) and carries out data interaction with the remote database (300) via the network interface.

In the pressure calibration apparatus described above, the communication module (3) is a hardware unit having a connecting plug and a network interface, the communication module (3) is mechanically and electrically connected to the main control unit (2) via the connecting plug, and accesses the network (200) and carries out data interaction with the remote database (300) via the network interface.

The pressure calibration apparatus further comprises a camera assembly electrically connected to the main control unit (2). The camera assembly comprises a camera (4), a surveillance camera (5) arranged on the camera (4), and an image recognition program embedded in the main control unit (2), wherein the surveillance camera (5) faces a front side of the calibrated pressure instrument (100), an image taken by the surveillance camera (5) is transmitted via the camera (4) to the main control unit (2), and the image recognition program performs image recognition of the image to acquire basic information of the calibrated pressure instrument.

The pressure calibration apparatus described above further comprises a display screen (10) electrically connected to the main control unit (2). The display screen (10) is a touch screen or a LED display unit configured to input the basic information of the calibrated pressure instrument or load the basic information of the calibrated pressure instrument from a configuration file.

In the pressure calibration apparatus described above, the pressure calibration unit (1) comprises a pressure generation unit (13), a pressure control module (11), a pressure measurement module (12), and a pressure interface module (14), which communicate with each other through an air pipeline, wherein the pressure measurement module (12) and the pressure control module (11) are electrically connected to the main control unit (2) respectively; the pressure interface unit (14) is externally connected to the calibrated pressure instrument (100), and the pressure measurement module (12) provides standard pressure data to the pressure control module (11), and high pressure air generated by the pressure generation unit (13) enters into the pressure control module (11) through the air pipeline and reaches to the calibrated pressure instrument (100) via the pressure interface module (14).

The pressure calibration apparatus described above further comprises an electrical signal calibration unit electrically connected to the main control unit (2). The electrical signal calibration unit comprises a current calibration unit (7) and/or a voltage calibration unit (8) connected to an electrical signal output end of the calibrated pressure instrument (100).

The pressure calibration apparatus described above further comprises a temperature measurement unit (6) electrically connected to the main control unit (2). The temperature measurement unit (6) is externally connected with a temperature sensor.

The present invention further provides a pressure instrument calibration information processing method, which utilizes the above-mentioned pressure calibration apparatus for operation, and realizes real-time information interaction between a calibrated pressure instrument and a remote database on an industrial field. The method comprises the following steps:

connection establishment: connecting the calibrated pressure instrument (100) to the pressure calibration unit (1) of the pressure calibration apparatus, connecting the communication module (3) to the network (200) and establishing a data access with the remote database (300);

information interaction: acquiring calibration information corresponding to the calibrated pressure instrument (100), by the pressure calibration apparatus, from the database (300) according to the basic information of the calibrated pressure instrument (100), in real time, wherein the calibration information comprises a calibration scheme or a calibration scheme and historical calibration data of the calibrated pressure instrument (100);

on-field calibration: performing on-field calibration of the calibrated pressure instrument (100), by the pressure calibration apparatus, via the pressure calibration unit (1), according to the obtained calibration scheme, to obtain current calibration data;

data transmission and storage: uploading the current calibration data and basic information in real time, by the main control unit (2), via the communication module (3) to the remote database (300), and storing the current calibration data and historical calibration data, by the remote database (300), according to the basic information.

In the pressure instrument calibration information processing method, in the information interaction step, the pressure calibration apparatus carries out data interaction with the remote database (300) by transmitting the basic information of the calibrated pressure instrument (100) to the main control unit (2), which in turn transmits the basic information to the communication module (3).

In the pressure instrument calibration information processing method described above, the basic information of the calibrated pressure instrument (100) is transmitted by inputting via the display screen (10) or loading from a configuration file, or is acquired by taking an image via the camera (4) and performing image recognition of the image with the image recognition program in the main control unit (2).

In the pressure instrument calibration information processing method described above, the historical calibration data comprises: indicated pressure values and indicated pressure errors of the calibrated pressure instrument at all pressure calibration points, or indicated pressure values, indicated pressure errors, current values, indicated current errors, voltage values, and indicated voltage errors at all pressure calibration points; the calibration scheme comprises an automatic calibration program that implements calibration operations; the basic information of the calibrated pressure instrument comprises: measurement range, accuracy, serial number, manufacturer information, and attribute information of the calibrated pressure instrument.

The pressure instrument calibration information processing method described above further comprises a step of judging the long-term stability of the calibrated pressure instrument (100), which is implemented by comparing the acquired current calibration data with the historical calibration data and judging the stability of the calibrated pressure instrument (100).

With the design described above, the present invention has the following features: in the apparatus provided in the present invention, since the communication module is integrated in the apparatus, a connection to a remote database can be established simply by setting, an intermediate communication medium and a cumbersome network connection setup process are omitted, the calibration information of the calibrated pressure instrument can be processed on the industrial field, i.e., historical calibration information can be downloaded in real time from the remote database and the generated current calibration data can be uploaded in real time to the remote database; the long-term stability of the pressure instrument can be evaluated by comparing the current calibration data with the historical calibration data; by taking an image with the camera assembly and performing image recognition of the obtained image, the basic information of the calibrated pressure instrument can be recognized automatically, a pre-setting step is omitted, and the operating efficiency is improved.

MAIN REFERENCE SIGNS

1—pressure calibration unit;
11—pressure control module; 111—air inlet valve; 112—buffer device; 113—micro-pressure regulation mechanism; 114—pressure regulation and control driving circuit;
12—pressure measurement module; 121—valve switching circuit; 122, 123—solenoid valve; 124, 125—pressure module; 126—pressure connector; 127—standard meter;
13—pressure generation module; 131—motor; 132—pump body;
14—pressure interface module; 141—standard pressure input end; 142—pressure connector; 144—air exhaust valve; 145—silencer;

2—main control unit; 21—control chip; 21-1—main control circuit board; 22—pressure module switching element; 22-1—interface circuit board; 23—digital communication interface; 24—display interface; 25—keyboard interface; 27—keyboard;
29—electrical signal detection circuit;
3—communication module;
4—camera; 5—surveillance camera;
6—temperature measurement unit; 61—current/voltage signal detection unit; 62—temperature/electrical signal conversion unit; 63—temperature measurement electrical interface;
7—current calibration unit; 71—current measurement circuit; 8—voltage calibration unit; 81—voltage measurement circuit; 87—external electrical measurement interface;
9—power supply; 10—display screen;
100—calibrated pressure instrument; 200—network; 300—database

DETAILED DESCRIPTION OF THE EMBODIMENTS

The present invention will be detailed in embodiments with reference to the accompanying drawings, as follows.

The pressure calibration apparatus provided in the embodiments employs a modular design, has an integrated remote communication function, can be configured simply to connect to a database, can carry out calibration and download historical calibration data corresponding to the basic information of a calibrated pressure instrument (including measurement range, accuracy, serial number and manufacturer information, etc. of the calibrated pressure instrument) and a calibration scheme, and upload current calibration data in real time on an industrial site, is more convenient, more efficient, and more intelligent.

Figure 1:
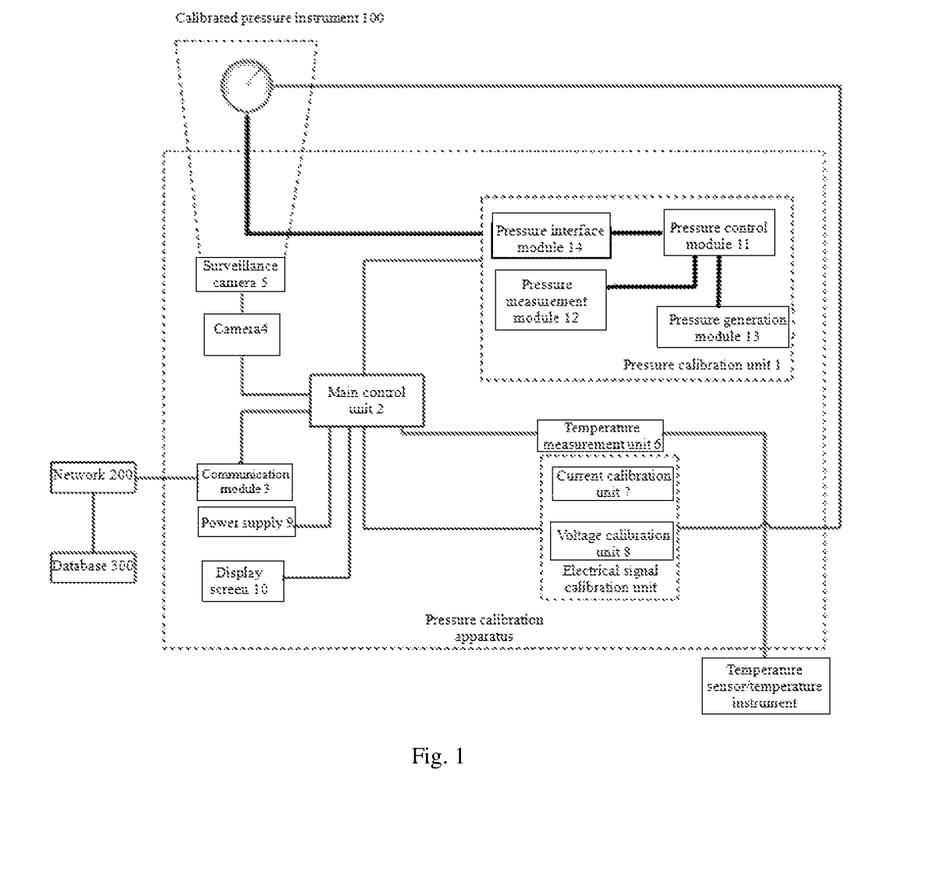
FIG. 1 is a structure diagram of the overall structure of the pressure calibration apparatus in the present invention.

As shown in FIG. 1, the pressure calibration apparatus in a first embodiment comprises a pressure calibration unit 1, a main control unit 2, and a communication module 3, wherein the main control unit 2 is electrically connected with the pressure calibration unit 1 and the communication module 3 respectively; the pressure calibration unit 1 is externally connected to a calibrated pressure instrument 100; the communication module 3 is connected to a database 300 through a network 200; the main control unit 2 sends control commands to the pressure calibration unit 1 and the communication module 3 to control the actions of the elements in the pressure calibration unit 1 and the communication module 3, and receives working state information of the elements, so that the pressure calibration apparatus operates safely and orderly.

Therein, the pressure calibration unit 1 comprises a pressure generation unit 13, a pressure control module 11, a pressure measurement module 12, and a pressure interface module 14, which communicate with each other through an air pipeline, wherein pressure measurement module 12 and the pressure control module 11 are electrically connected to the main control unit 2 respectively (in FIG. 1, the thick line represents an air circuit connection, while the fine line represents an electrical connection). The pressure interface unit 14 is externally connected to the calibrated pressure instrument 100; the pressure measurement module 12 provides standard pressure data to the pressure control module 11; high pressure air generated by the pressure generation unit 13 enters into the pressure control module 11 through the air pipeline and reaches to the calibrated pressure instrument 100 via the pressure interface module 14 and a calibration operation is carried out under the control of the main control unit 2 with reference to the standard pressure data provided by the pressure measurement module 12.

The main control unit 2 comprises a main control chip and a peripheral circuit; a corresponding control algorithm is usually embedded in the main control chip; the main control unit 2 is electrically connected with the pressure generation unit 13, the pressure control module 11, the pressure measurement module 12, and the pressure interface module 14 of the pressure calibration unit 1 respectively, sends control commands to the modules to control the actions of the modules and receives the state information of the modules. The main control unit 2 is further electrically connected with a power supply 9 and a display screen 10, wherein the power supply 9 may be a replaceable battery or a rechargeable battery, or an external power source, which supplies power to the other units of the apparatus; the display screen 10 may be a touch screen or LED display unit, which is configured to set or input basic information and working parameters of the calibrated pressure instrument, and display data results and/or data curves.

The communication module 3 accomplishes data interaction between the main control unit 2 and the remote database 300, and has a remote communication function. Viewed from the manner of implementation, the communication module 3 may be a communication program integrated in the main control unit 2. In that case, the main control unit 2 is provided with a network interface to access the network 200; alternatively, the communication module 3 may be a separate hardware module; for example, the communication module 3 has a connecting plug and a network interface, wherein the connecting plug is configured to couple to the main control unit 2 to realize mechanical and electrical connections between the communication module 3 and the main control unit 2, and the network interface is connected to the network 200 and accesses the database 300 through the network 200. Therein, the network 200 may be an Internet-based industrial Ethernet or any other wireless network that supports Internet connection, and can realize a remote communication function.

To adapt to different calibration requirements, the pressure calibration apparatus in a second embodiment may further comprise an electrical signal calibration unit electrically connected to the main control unit 2, wherein the electrical signal calibration unit comprises a current calibration unit 7 and/or a voltage calibration unit 8; the current calibration unit 7 and the voltage calibration unit 8 are externally connected to an electrical signal output end of the calibrated pressure instrument to realize calibration of electrical signals output from the calibrated pressure instrument. Please see FIGS. 1 and 3.

Figure 3:
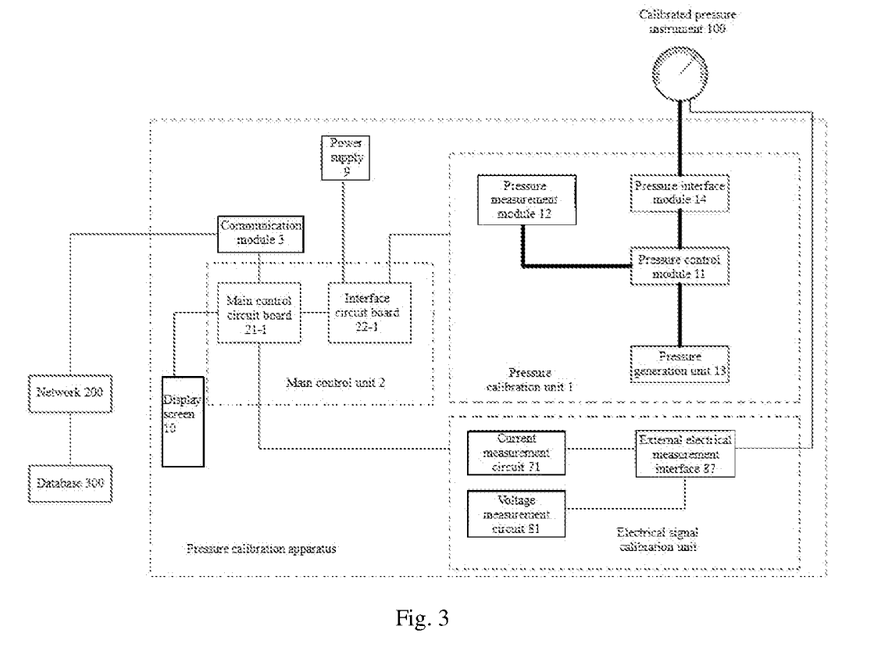
FIG. 3 is a structure diagram of the structure of an embodiment B of the pressure calibration apparatus in the present invention.

The current calibration unit 7 mainly comprises a high-precision current signal detection unit. The electrical signal output end of the calibrated pressure instrument outputs current signals corresponding to different indicated current values. The current signal is connected via the electrical interface (an analog current input interface or digital current signal input interface) to a current signal detection unit 7, and is compared (with a standard current value), and thereby the calibration of the current signal outputted from the calibrated pressure instrument is realized.

The voltage calibration unit 8 mainly comprises a high-precision voltage signal detection unit, the calibrated pressure instrument outputs voltage signals corresponding to different indicated voltage values. The voltage signal is connected via an electrical interface (an analog voltage input interface or digital voltage signal input interface) to a voltage signal detection unit 8, and is compared (with a standard voltage value), and thereby the calibration of the voltage signal outputted from the calibrated pressure instrument is realized.

The pressure calibration apparatus in a third embodiment may further comprise a temperature measurement unit 6 electrically connected to the main control unit 2, wherein the temperature measurement unit 6 mainly comprises a high-precision current/voltage signal detection unit 61 and a temperature/electrical signal conversion unit 62. The temperature measurement unit 6 is connected to a temperature instrument or a temperature sensor on the field via a temperature measurement electrical interface 63. Please see FIGS. 1 and 4.

Figure 4:
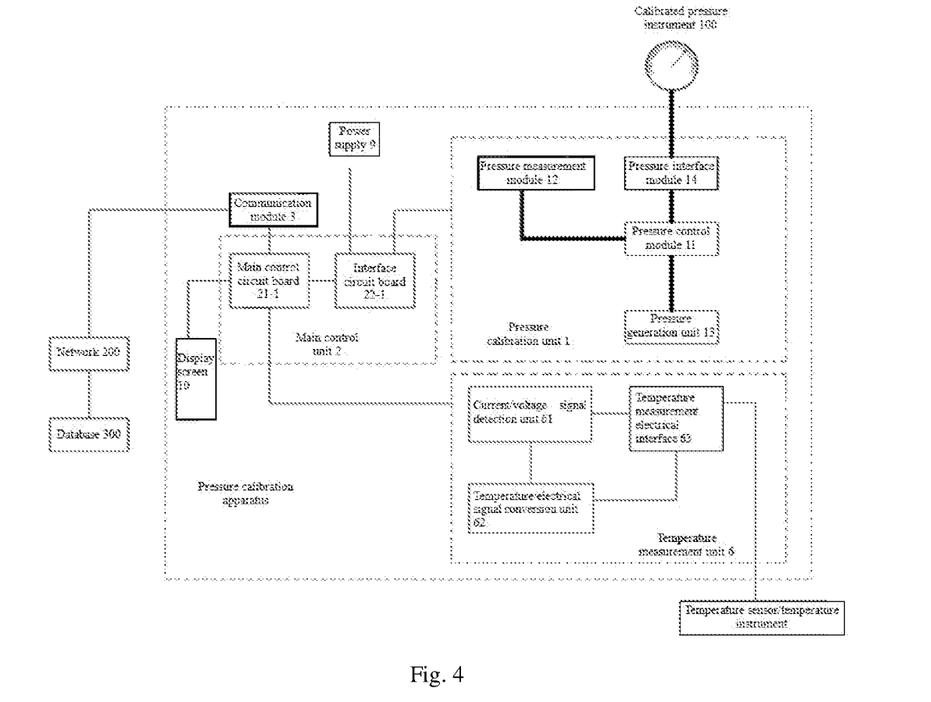
FIG. 4 is a structure diagram of the structure of the third embodiment of the pressure calibration apparatus in the present invention.

On one hand, the temperature measurement unit 6 can acquire the temperature value sensed by the temperature sensor or a temperature instrument by connecting to the temperature instrument or the temperature sensor.

On the other hand, the temperature measurement unit 6 is connected to the temperature instrument or the temperature sensor; the current/voltage signal output from an electrical signal output end of the temperature instrument or the temperature sensor is connected via an electrical interface 63 of the pressure calibration apparatus connected with the temperature measurement unit 6 (an analog current/voltage input interface or digital current/voltage signal input interface) to the current/voltage signal detection unit 61 of the temperature measurement unit 6; the temperature/electrical signal conversion unit 62 compares the acquired signal with standard temperatures and standard current/voltage signal values and performs a temperature conversion, so as to realize calibration of the temperature instrument or temperature sensor.

Based on the above embodiments, the pressure calibration apparatus in an optimized embodiment further comprises a camera assembly electrically connected to the main control unit 2. As shown in FIG. 1, the camera assembly comprises a camera 4, a surveillance camera 5 arranged on the camera 4, and an image recognition program embedded in the main control unit 2, wherein the surveillance camera faces a front side of the calibrated pressure instrument 100, and takes an image containing the data displayed on the dial of the calibrated pressure instrument 100, and basic information and appearance characteristics of the calibrated pressure instrument 100; the acquired image (photo) is transmitted via the camera 4 to the main control unit 2, the image recognition program embedded in the main control unit 2 performs image recognition of the acquired photo, and thereby obtains the basic information of the calibrated pressure instrument. In a scenario, the basic information may be any of the following items: the measurement range, accuracy, the serial number, the manufacturer and attribute information of the calibrated pressure instrument; in another scenario, the basic information may be a combination of at least two of the following items: the measurement range, accuracy, the serial number, the manufacturer and attribute information of the calibrated pressure instrument. Therein, the attribute information of the calibrated pressure instrument may be determined according to different implementation scenarios. For example, in a scenario that the surface image of the calibrated pressure instrument 100 shows unique ID information (ID code) of the calibrated pressure instrument 100, and the attribute information of the calibrated pressure instrument may be the ID code.

In the pressure calibration apparatus, since the communication module 3 is integrated in the apparatus, and the apparatus has a remote communication function, an intermediate communication medium is omitted; the apparatus can be connected to a remote database 300 simply by connecting the apparatus to a supported network and setting the apparatus simply; then, the apparatus can download pre-stored basic information of the calibrated pressure instrument 100 (including the measurement range, accuracy, the serial number, the manufacturer and instrument attribute information, etc.), historical calibration data of the calibrated pressure instrument 100 (including indicated pressure values and indicated pressure errors at all pressure calibration points, or indicated pressure values, indicated pressure errors, current values, indicated current errors, voltage values, and indicated voltage errors at all pressure calibration points, etc.), and a calibration scheme (including an automatic calibration program for performing calibration operations) in real time; on the other hand, the communication module 3 can upload the current calibration data of the calibrated pressure instrument 100 to the remote database 300 through the network 200 in real time.

The pressure calibration unit 1 and the main control unit 2 constitute a standard pressure calibration apparatus; by integrating the communication module 3 or the communication module 3 and the camera assembly in the standard pressure calibration apparatus, a more intelligent and more convenient pressure calibration apparatus is formed. The pressure calibration apparatus provided in the present invention will be further described in two embodiments as follows.

Embodiment A

Figure 2:
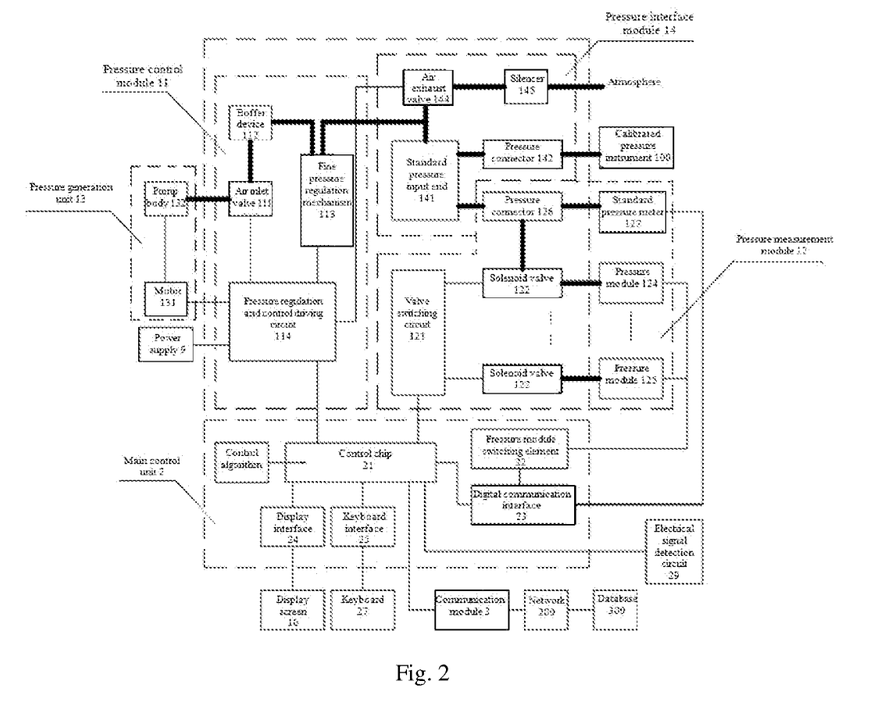
FIG. 2 is a structure diagram of the structure of an embodiment A of the pressure calibration apparatus in the present invention.

As shown in combination FIG. 1 with FIG. 2, in Embodiment A, the pressure generation unit 13 generates air pressure via an air boosting pump, wherein the air boosting pump directly communicates with the atmosphere and generates air pressure by compressing the air, without any external air cylinder. Theoretically, any air pump that can generate air pressure by compressing the air may be used. In this embodiment, preferably an air boosting pump developed by the applicant independently, i.e., a high-pressure two-way mini-type motor-driven air pump (hereinafter referred to as a mini-type pressure pump), is used in the pressure calibration apparatus. The air boosting pump has features including automatic pressurization, high pressure buildup, and high pressure boosting efficiency, and employs a high-pressure check valve technique. In Embodiment A shown in FIG. 2, the pressure generation unit 13 comprises a pump body 132 and a motor 131 that drives the pump body 132 to operate, wherein, the pump body 132 is driven by the motor 131 to repeat an air suction and exhaust process continuously, so that the air is compressed continuously and high pressure air is generated. Please see the description for the specific structure and operating principle of the pressure generation unit 13 in the patent document No. CN102252805B.

The pressure control module 11 controls the air pressure; the air circuit part comprises an air inlet valve 111, a buffer device 112, and a micro-pressure regulation mechanism 113 that communicate with each other through an air circuit (represented by a thick line in FIG. 2), wherein the air inlet valve 111 communicates with an air output pipeline of the pump body 132 in the pressure generation unit 13 and serves as an pressure input end of the pressure control module 11, and the micro-pressure regulation mechanism 113 communicates with the air circuit of the pressure interface module 114, and the buffer device 112 is a pressure container that has a fixed shape, and is mainly configured to filter off the fluctuations in the air flow into the air inlet valve 111, and stabilize and store air pressure; the air flowing through the buffer device 112 enters into the micro-pressure regulation mechanism 113, for an accurate control and regulation of the pressure. The control part of the pressure control module 11 comprises a pressure regulation and a control driving circuit 114, which is electrically connected with the power supply 9, the air inlet valve 111, the micro-pressure regulation mechanism 113, the air exhaust valve 144 of the pressure interface module 14, and the main control chip 21 of the main control unit 2 respectively (represented by a thin line in FIG. 2); the control function of the pressure regulation and the control driving circuit 114 is implemented under the driving of the main control chip 21 of the main control unit 2, and is mainly used to exercise an electric control of the on/off state of the air inlet valve 111 and the air exhaust valve 144, realize air inflow or exhaust pressure regulation and control, and realize fine control of the output pressure under the control of the micro-pressure regulation mechanism 113. In addition, when the pressure generation unit 13 shown in FIG. 2 is used, the pressure regulation and the control driving circuit 114 is further electrically connected to the motor 131 to control the motor 131 to operate orderly.

The pressure interface module 14 comprises the air exhaust valve 144 and a standard pressure input end 141, wherein the standard pressure input end 141 communicates with the micro-pressure regulation mechanism 113 of the pressure control module 11 through an air circuit, and is externally connected to the calibrated pressure instrument 100 via a pressure connector 142; the air exhaust valve 144 communicates with the atmosphere via a silencer 145.

The pressure measurement module 12 comprises a pressure connector 126 that communicates with the standard pressure input end 141 of the pressure interface module 14 through the air circuit. The pressure connector is connected in parallel with the pressure connector 142 to the standard pressure input end 141, and is used to connect a standard pressure device. In a case that the standard pressure device is a standard pressure meter 127, the standard meter 127 is directly connected on the pressure connector 126, and may be replaced with a standard meter 126 with a different measurement range manually to carry out calibration of a calibrated pressure instrument 100 with a corresponding measurement range; in a case that the standard pressure device is a pressure module (pressure sensor), the pressure connector 126 communicates with a pressure module 124 or 125 via a plurality of solenoid valves 122 or 123, respectively, and can be switched to the pressure module 124 or 125 that has a different measurement range via a valve switching circuit 121, wherein the pressure modules are connected to the pressure connector 126 through air circuits via corresponding solenoid valve, and the solenoid valves are electrically connected to the valve switching circuit 121.

The main control unit 2 comprises a control chip 21, and a display interface 24, a keyboard interface 25, and a data communication interface 23 that are connected to the control chip 21, wherein control algorithms (e.g., a well-known special self-adapting PID pressure control algorithm and relevant voltage and current algorithms) are embedded in the control chip 21, and are a brain of the entire apparatus, which are used to issue control commands; the data communication interface 23 is electrically connected to the main control chip 21. In a case that the standard pressure device of the pressure measurement module 12 is a standard meter 127, the data communication interface 23 may be directly connected to the standard meter 127 to receive the pressure value of the standard meter 127 and transmit the pressure value to the main control chip 21; in a case that the standard pressure device is a plurality of pressure modules (with different measurement ranges), the pressure value of the positioned pressure module 124 or 125 is transmitted via a pressure module switching element 22 (e.g., a positioner) to the control chip 21 via the digital communication interface 23, and is compared with a preset pressure value in the control chip 21; the pressure control algorithm calculates a control variable according to the difference, and then sends the calculated control variable to the pressure regulation and the control driving circuit 114, and the pressure regulation and control driving circuit 114 controls the air inlet valve 111, the air exhaust valve 144, and the micro-pressure regulation mechanism 113, and thereby realizes a feedback control for accurate pressure generation; the control chip 21 is externally connected with a keyboard 27 via the keyboard interface 25, and is externally connected with a display unit 26 via the display interface 24; pressure settings and data parameters for program-controlled operation are input with the keyboard 27, and pressure control results or curves are displayed on the standard meter 127 or the display screen 26.

The control chip 21 of the main control unit 2 is further connected with an electrical signal detection circuit 29, so that the electrical signal of the calibrated pressure instrument 100 can be detected and calibrated while the calibrated pressure instrument 100 is calibrated, and integrated calibration of pressure and electrical signals can be realized; the pressure calibration apparatus equipped with the additional electrical signal detection circuit 29 can also carry out the electrical signal detection and calibration for other current and voltage instruments. After the electrical signal of a calibrated instrument is connected to the electrical signal detection circuit 29, the electrical signal is converted into a digital signal and input to the control chip 21 connected with the electrical signal detection circuit 29; in the control chip 21, detected electrical signal data or on/off state information of the pressure switch is obtained through calculation with a calculation formula that is preset in the control chip 21, and is displayed on the display screen 10. Here, the detected value of an electrical signal may be used as an indicated value of the electrical signal output from the calibrated instrument, or may be used as a calibrated value of the output signal from the calibrated pressure instrument 100, to judge the deviation of the electrical signal value output from the calibrated instrument from the standard value, or judge whether the electrical signal value output from the calibrated pressure instrument 100 matches a specified value. The calibrated data of electrical signal may be temporarily stored in a memory unit of the control chip 21, and may be uploaded to the database 300 via the communication module 3.

The communication module 3 or the communication module 3 and the camera assembly are directly and electrically connected to the control chip 21 of the main control unit 2, and perform data interaction directly with the control chip 21. Therein, the communication module 3 supports the industrial Ethernet communication protocol and the wireless network protocol, and can access Internet.

Embodiment B

In Embodiment B as shown in FIGS. 1 and 3, the main control unit 2 comprises a main control circuit board 21-1 and an interface circuit board 22-1, wherein the interface circuit board 22-1 is an integrated circuit board for the air circuit components of the pressure calibration unit 1, all of the pressure control module 11, the pressure interface module 14, and the pressure measurement module 12 of the pressure calibration unit 1 are connected to the interface circuit board 22-1, and are connected to the main control circuit board 21-1 via interface circuit board plugs mounted on the interface circuit board 22-1, and the main control circuit board 21-1 carries out an intelligent control for the air circuit via the interface circuit board 22-1. The main control circuit board 21-1 is an integrated circuit board, on which a core control board (a central control unit (CPU), loaded with commercial system control software and associated pressure calibration algorithm and electrical measurement and calculation algorithm software), a memory unit, measurement circuits (connected to external electrical measurement interfaces), and a display screen socket, and USB interfaces, etc. are distributed.

The main control circuit board 21-1 is further connected with a current measurement circuit 71 and a voltage measurement circuit 81, which are connected externally to an electrical interface of the calibrated instrument via a pair of external electrical measurement interfaces 87, wherein, the electrical interface may be an output electrical interface of an ammeter or a voltmeter, or may be an electrical signal output end of the calibrated pressure instrument 100, so as to realize integrated pressure and electrical signal calibration operations.

Embodiment C

Embodiment C provides a pressure instrument calibration information processing method, which employs the above-mentioned pressure calibration apparatus for on field calibration operation. Firstly, basic information of the calibrated pressure instrument is obtained by inputting on the touch screen or taking an image and performing an image recognition, and a corresponding calibration scheme is retrieved from a remote database according to the basic information; then, the calibrated pressure instrument is calibrated according to the calibration scheme to obtain current calibration data, and then current calibration data is uploaded together with the basic information; the remote database retrieves corresponding historical data according to the basic information, and stores the current calibration data and the historical data in correspondence to each other.

Specifically, the steps of the method include:

Connection establishment: the calibrated pressure instrument 100 is connected to the pressure calibration unit 1, the communication module 3 is connected to the network 200, and a connection with the remote database 300 is established;

Information interaction: the main control unit 2 acquires calibration information corresponding to the basic information of the calibrated pressure instrument 100 from the remote database 300 in real time via the communication module 3 on the basis of the basic information of the calibrated pressure instrument 100, wherein the calibration information includes a calibration scheme or a calibration scheme and historical calibration data of the calibrated pressure instrument 100;

On field calibration: the main control unit 2 performs on field calibration of the calibrated pressure instrument 100 via the pressure calibration unit 1 according to the obtained calibration scheme, to obtain current calibration data;

Data transmission and storage: the main control unit 2 uploads the current calibration data and the basic information of the calibrated pressure instrument 100 via the communication module 3 to the remote database 300 in real time, and the remote database 300 stores the current calibration data and the historical calibration data in correspondence to each other according to the basic information.

In the above-mentioned information interaction step, the basic information of the calibrated pressure instrument 100 is transmitted to the main control unit 2 of the pressure calibration apparatus, and the main control unit 2 transmits the basic information of the calibrated pressure instrument 100 to the communication module 3. Therein, the basic information of the calibrated pressure instrument 100 may be transmitted in one of the following three ways, depending on the specific configuration of the pressure calibration apparatus:

(1) Inputting manually via the display screen 10 in a case that there is no camera assembly in the pressure calibration apparatus, i.e., the basic information of the calibrated pressure instrument 100 is input manually via the display screen 10 and transmitted to the main control unit 2, when the camera assembly is not provided in the above pressure calibration apparatus;

(2) Loading from a configuration file in a case that there is no camera assembly in the pressure calibration apparatus, i.e., a configuration file containing the basic information of the calibrated pressure instrument 100 is loaded into the main control unit 2, and the main control unit 2 extracts the basic information of the calibrated pressure instrument 100 from the configuration file, when the camera assembly is not provided in the above pressure calibration apparatus.

(3) Acquiring by taking an image with the camera 4 and performing image recognition of the image with an image recognition program in the main control unit 2, i.e., the camera 4 of the camera assembly takes an image of the calibrated pressure instrument 100, and an image recognition program embedded in the main control unit 2 in advance performs image recognition of the obtained image to acquire the basic information of the calibrated pressure instrument 100, when the camera assembly is provided in the above pressure calibration apparatus.

The basic information may be any of the following items: the measurement range, accuracy, the serial number, the manufacturer and attribute information of the calibrated pressure instrument; alternatively, the basic information may be a combination of at least two of the following items: the measurement range, accuracy, the serial number, the manufacturer and attribute information of the calibrated pressure instrument. Therein, the attribute information of the calibrated pressure instrument may be determined according to different implementation scenarios. For example, in a scenario that the surface image of the calibrated pressure instrument 100 shows unique ID information (ID code) of the calibrated pressure instrument 100, the attribute information of the calibrated pressure instrument may be the ID code.

The current calibration information obtained by the above method may be compared with historical calibration information to judge the long-term stability of the calibrated pressure instrument 100. The stability judgment may be carried out anywhere, i.e., the long-term stability of the calibrated pressure instrument 100 may be judged by connecting to the database 300 and downloading the current calibration data and historical calibration data, and carrying out comparison or statistical analysis. For example, the long-term stability of the calibrated pressure instrument 100 may be judged by means of statistical analysis methods, such as a regression analysis method and a variance analysis method, etc.

The calibration scheme acquired in the above information interaction step refers to an automatic calibration program for calibration operation, and the pressure calibration apparatus carries out automatic calibration according to the acquired calibration scheme.

In an example, the automatic calibration process is as follows: according to the acquired calibration scheme (i.e., an automatic calibration program), the main control unit 2 controls the pressure control module 11 to generate calibration pressure and supply the calibration pressure to the pressure calibration circuit, the calibrated pressure instrument 100 outputs a current signal after it receives a standard pressure, the electrical interface of the calibrated pressure instrument 100 is connected to the current calibration unit 7, then the main control unit 2 controls the current calibration unit 7 with the automatic calibration program to read the current value output from the calibrated pressure instrument 100, and performs calculation according to the output current value to obtain a pressure value.

Different calibration points may be set in the calibration scheme according to the calibration requirements for different calibrated pressure instruments (e.g., 10 calibration points may be set for high-precision calibrated pressure instruments, while 5 calibration points may be set for low-precision calibrated pressure instruments); thus, the main control unit 2 carries out a calibration operation control according to the preset quantity of the calibration points to perform calibration operations point by point for the calibrated pressure instrument 100, so as to obtain calibration data at the calibration points.

In a case that there is no camera assembly in the pressure calibration apparatus, the following steps shall be executed to acquire the historical calibration data and calibration schemes in the information acquisition process:

The basic information of the calibrated pressure instrument 100 is preset via the display screen 10 and stored in the main control unit 2; the main control unit 2 transmits the basic information of the calibrated pressure instrument 100 to the communication module 3, and then the communication module 3 downloads historical calibration data and calibration scheme corresponding to the basic information of the calibrated pressure instrument from the database 300 through the network 200 in real time.

INDUSTRIAL APPLICABILITY

The pressure calibration apparatus provided in the present invention includes a communication module and a camera assembly, and it utilizes the camera assembly to acquire an image of the calibrated pressure instrument to extract basic information of the calibrated pressure instrument from the image, utilizes the communication module to establish a connection with a remote database through a network, accomplishes processing of calibration information for the calibrated pressure instrument on an industrial field, and realizes data interaction for the calibration information. The pressure calibration apparatus provided in the present invention is applicable to industrial production and application.

The invention claimed is:

1. A pressure instrument calibration information processing method, utilizing a pressure calibration apparatus for operation, and the pressure calibration apparatus for calibrating a calibrated pressure instrument (100) on a site comprises:
    a pressure calibration unit (1) externally connected to the calibrated pressure instrument (100);
    a main control unit (2) electrically connected to the pressure calibration unit (1); and
    a communication module (3) that is electrically connected to the main control unit (2) and carries out data interaction with a remote database (300) through a network (200), uploading basic information of the calibrated pressure instrument (100) and current calibration data to the remote database (300), acquiring calibration information corresponding to the calibrated pressure instrument (100) form the remote database (300);
    the pressure instrument calibration information processing method comprises the following steps:
    connection establishment: connecting the calibrated pressure instrument (100) to the pressure calibration unit (1) of the pressure calibration apparatus, connecting the communication module (3) to the network (200) and establishing a data connection with the remote database (300);
    information interaction: acquiring calibration information corresponding to the calibrated pressure instrument (100), by the pressure calibration apparatus, from the database (300) according to the basic information of the calibrated pressure instrument (100), in real time, wherein the calibration information comprises a calibration scheme or a calibration scheme and historical calibration data of the calibrated pressure instrument (100);
    on-site calibration: performing on-site calibration of the calibrated pressure instrument (100), by the pressure calibration apparatus, via the pressure calibration unit (1), according to the obtained calibration scheme, to obtain current calibration data;
    data transmission and storage: uploading basic information and the current calibration data in real time, by the main control unit (2), via the communication module (3) to the remote database (300), and storing the current calibration data and historical calibration data, by the remote database (300), according to the basic information.

2. The pressure instrument calibration information processing method according to claim 1, wherein,
    in the information interaction step, the pressure calibration apparatus carries out data interaction with the remote database (300) by transmitting the basic information of the calibrated pressure instrument (100) to the main control unit (2), which in turn transmits the basic information to the communication module (3).

3. The pressure instrument calibration information processing method according to claim 2, wherein,
    the basic information of the calibrated pressure instrument (100) is transmitted by loading from a configuration file.

4. The pressure instrument calibration information processing method according to claim 1, wherein, the historical calibration data comprises: indicated pressure values and indicated pressure errors of the calibrated pressure instrument at all pressure calibration points, or indicated pressure values, indicated pressure errors at all pressure calibration points;
    the calibration scheme comprises an automatic calibration program that implements calibration operations;
    the basic information of the calibrated pressure instrument comprises any of the following items or a combination of at least two of the following items: measurement range, accuracy, serial number, manufacturer information, and attribute information of the calibrated pressure instrument.

5. The pressure instrument calibration information processing method according to claim 1, further comprising a step of judging the long-term stability of the calibrated pressure instrument (100), which is implemented by comparing the acquired current calibration data with the historical calibration data and judging the stability of the calibrated pressure instrument (100).

6. The pressure instrument calibration information processing method according to claim 1, wherein,
the pressure calibration apparatus further comprises a display screen (10) electrically connected to the main control unit (2), wherein the display screen (10) is a touch display screen or an LED display unit;
the basic information of the calibrated pressure instrument (100) is transmitted by inputting via the display screen (10).

7. The pressure instrument calibration information processing method according to
claim 1, wherein,
the pressure calibration apparatus further comprises an electrical signal calibration unit electrically connected to the main control unit (2), wherein the electrical signal calibration unit comprises a current calibration unit (7) and/or a voltage calibration unit (8) connected to an electrical signal output end of the calibrated pressure instrument (100);
the historical calibration data comprises: indicated pressure values and indicated pressure errors of the calibrated pressure instrument at all pressure calibration points, or indicated pressure values, indicated pressure errors, current values, indicated current errors, voltage values, and indicated voltage errors at all pressure calibration points;
the calibration scheme comprises an automatic calibration program that implements calibration operations;
the basic information of the calibrated pressure instrument comprises any of the following items or a combination of at least two of the following items: measurement range, accuracy, serial number, manufacturer information, and attribute information of the calibrated pressure instrument.

8. The pressure instrument calibration information processing method according to claim 1, and the pressure calibration apparatus further comprises a camera assembly electrically connected to the main control unit (2), wherein the camera assembly comprises a camera (4), a surveillance camera (5) arranged on the camera (4), and an image recognition program embedded in the main control unit (2), wherein the surveillance camera (5) faces a front side of the calibrated pressure instrument (100) and takes an image of the calibrated pressure instrument (100), the image taken by the surveillance camera (5) being transmitted via the camera (4) to the main control unit (2), and the image recognition program performs image recognition of the image and acquires basic information of the calibrated pressure instrument;
wherein,
the basic information of the calibrated pressure instrument (100) is acquired by taking an image via the camera (4) and performing image recognition of the image with the image recognition program in the main control unit (2).

* * * * *